May 20, 1969   R. T. FLORINE   3,444,671
ENGINE INDUCTION AIR FLOW CONTROL
Filed Feb. 20, 1967

INVENTOR.
Robert T. Florine
C. K. Veenstra
ATTORNEY

United States Patent Office 3,444,671
Patented May 20, 1969

3,444,671
ENGINE INDUCTION AIR FLOW CONTROL
Robert T. Florine, Flint, Mich., assignor to General Motors Corporation, Detroit, Mich., a corporation of Delaware
Filed Feb. 20, 1967, Ser. No. 617,178
Int. Cl. F02m 35/14, 31/06
U.S. Cl. 55—267                                5 Claims

ABSTRACT OF THE DISCLOSURE

An internal combustion engine air cleaner and silencer assembly having a pair of inlets for air at ambient temperature is connected to a source of heated air. A primary valve controls the flow of heated air into the air cleaner and the flow of ambient air through one inlet. The primary valve is positioned by an induction vacuum operated motor; the vacuum sensed by this motor is varied by a thermostatically operated air bleed. A secondary valve, operated by a motor responsive solely to induction vacuum, controls the flow of ambient air through the other inlet.

Background of the invention

Frequent proposals made throughout many years have recommended arrangements for heating the air supplied through the induction system of an internal combustion engine. Such arrangements have as their object an improvement in vaporization of the fuel delivered into the air stream. When it is considered that the engine requires vaporized fuel for combustion and that fuel not vaporized cannot be completely burned in the combustion chamber, it will be appreciated that an improvement in vaporization of the fuel in the induction system permits a leaner calibration of the carburetor and a resultant, although perhaps only slight, improvement in operating economy. Even more important from the current viewpoint, however, is the reduction achieved in the emission of unburned hydrocarbons in the exhaust gases, accomplished by reducing the amount of unvaporized fuel which cannot be completely burned in the combustion chambers and which must be exhausted. As a further advantage, the addition of heat reduces the possibility of icing which may occur in the carburetor during low speed operation.

The prior arrangements generally approached their intended result by utilizing a thermostat, responsive to variations in temperature of some portion of the engine, to position a valve which mixes warmed and cool air. The disadvantage of such arrangements is that the thermostat must necessarily be strong enough to overcome the effects of friction and air flow on the valve. Such a thermostat is not only extremely large and expensive; it is relatively insensitive or only slowly responsive to temperature variations.

Furthermore, the prior proposals generally failed to recognize that during wide open throttle operation of the engine heating of the induction air flow is undesirable and may be unnecessary. The addition of heat reduces the density of the induction air flow and thus reduces the mass of air in the combustion chamber, thereby lessening the power output. It is also throught possible that the characteristics of air flow during wide open throttle operation are such that substantially complete evaporation may occur without the addition of heat.

Summary of the invention

This invention provides the requisite heating of the induction air flow during idle and part throttle operation and avoids heating of the air flow during wide open throttle operation. Temperature control is accomplished by a very small and sensitive thermostat which is responsive to the induction air flow temperature and which is not required to directly operate a mixing valve. Instead induction vacuum powered means position a valve mechanism to control warm and ambient temperature air flow and the sensitive thermostat is utilized as a regulator for the induction vacuum signal.

The temperature control arrangement is incorporated in an air cleaner and silencer unit having a pair of inlet snorkels. Warm air is mixed with air at ambient temperature preferably supplied by only one snorkel during part throttle operation. During wide open throttle operation both snorkels supply air at ambient temperature without the addition of warm air.

Such an arrangement also substantially enhances the silencing ability of the air cleaner and silencer unit without sacrificing its air flow capacity. During most conditions of engine operation the valve mechanism blocks the opening of the second snorkel, leaving the opening of the first snorkel as the only source for emission of noise. When the requirements for air flow exceed the capacity of the first snorkel, the valve opens the second snorkel. Thus the high restriction to noise emission of a single snorkel unit is combined with the air flow capacity of a dual snorkel unit.

The details as well as other objects and advantages of this invention are shown in the drawing and discussed in the description of a preferred embodiment.

Description of a preferred embodiment

Figure 1:
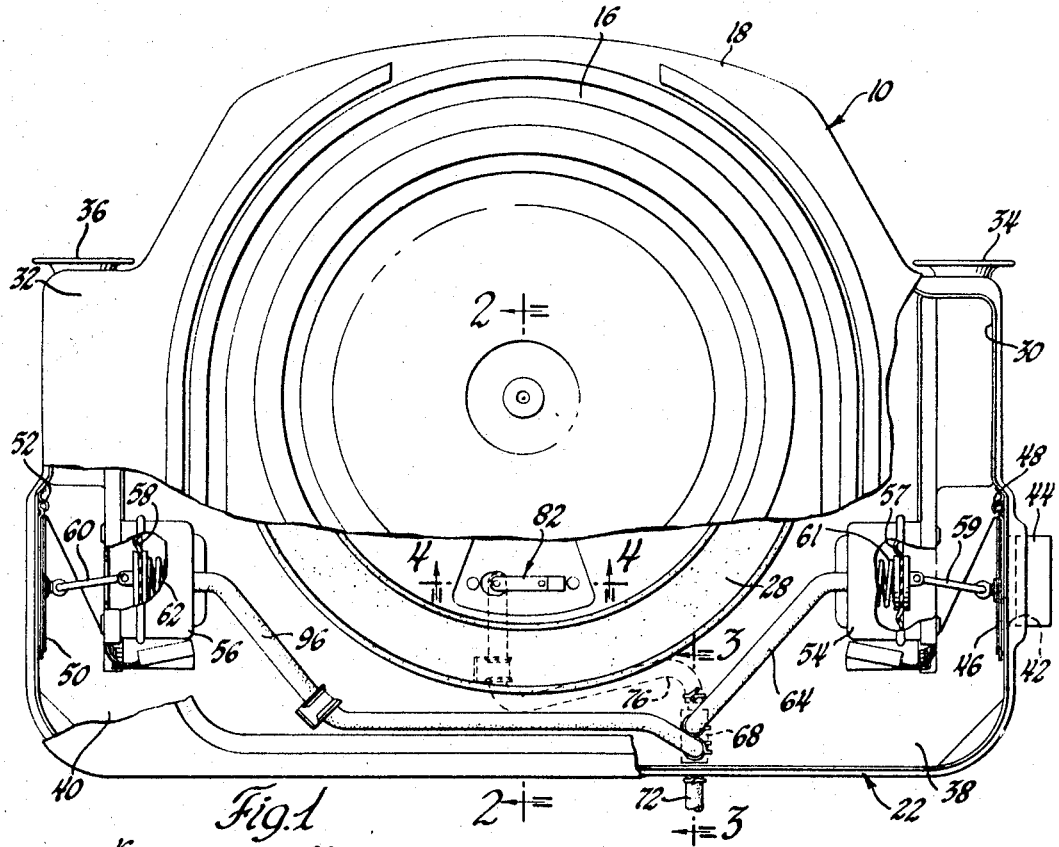
FIGURE 1 is a top plan view of an air cleaner and silencer assembly with parts broken away to show the air flow control arrangement.
Figure 2:
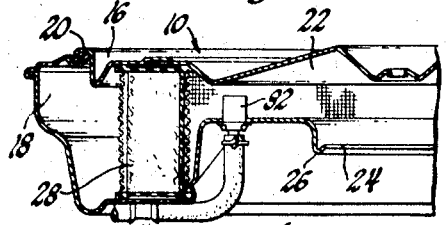
FIGURE 2 is a sectional view along line 2—2 of FIGURE 1 illustrating the location of the thermal control.
Figure 3:
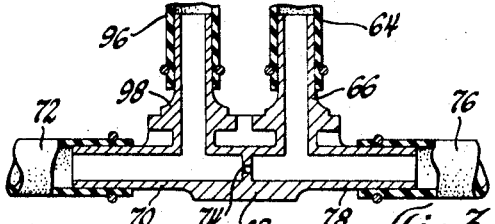
FIGURE 3 is a sectional view along line 3—3 of FIGURE 1 illustrating the interconnection of the vacuum lines.
Figure 5:
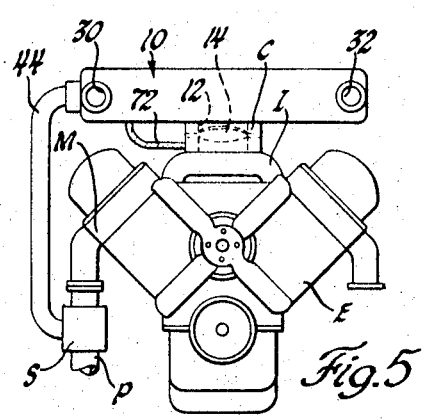
FIGURE 5 is a view of an internal combustion engine having the air cleaner mounted thereon and showing the connections to the induction system and to the air heating stove about the exhaust pipe.
Figure 4:
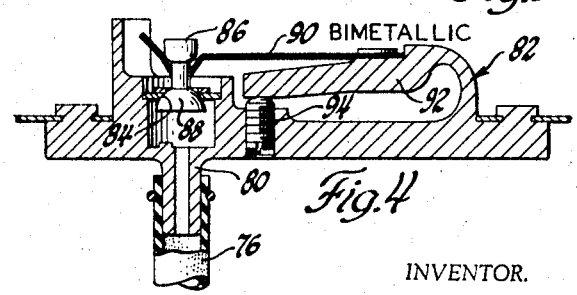
FIGURE 4 is a sectional view along line 4—4 of FIGURE 1 illustrating the thermal sensor.

Referring first to FIGURE 5, an internal combustion engine E includes an intake manifold I and a carburetor C which has an air cleaner and silencer assembly 10 mounted thereon. Carburetor C and intake manifold I form an induction passage 12 in which a throttle 14 is disposed to control the air flow to the engine. Engine E also includes an exhaust manifold M which discharges through an exhaust pipe P. A stove S is disposed about exhaust pipe P to provide a source of heated air.

Referring to the remaining figures, air cleaner 10 is constructed of upper and lower housing members 16 and 18 joined together with a sealing element 20 to form a chamber 22. The lower housing member 18 is provided with an outlet 24 having an annular rim 26 adapted for mounting on carburator C. An annular air filter element 28 is disposed in chamber 22 surrounding outlet 24.

Disposed on opposite sides of air cleaner 10 are a pair of tuned inlet conduits or snorkels 30 and 32 the ends 34 and 36 of which are open to air at ambient or understood temperature at the front of air cleaner 10 and which discharge through openings 38 and 40 into chamber 22.

The primary inlet conduit 30 has a lateral opening 42 to which is connected a conduit 44 leading from stove S. A valve 46 is pivoted at 48 and may be swung between the position shown, preventing air flow through lateral opening 42, and a position preventing air flow through the open end 34 of primary snorkel 30. In the position shown, only air at ambient temperature may be admitted to the engine, whereas as the valve 46 moves away from opening 42, increasing amounts of heated air and decreasing amounts of ambient air are admitted and mixed to flow to the engine.

Secondary snorkel 32 has no lateral opening for admission of warm air, but is provided with a valve 50 similarly pivoted at 52 to control the flow of air at ambient temperatures therethrough.

Values 46 and 50 are positioned by a pair of vacuum motors including vacuum units 54 and 56 provided with pressure responsive diaphragms 57 and 58 connected through articulated links 59 and 60 to their respective valves. Vacuum units 54 and 56 are also provided with springs 61 and 62 biasing the valves 46 and 50 into the position shown.

Vacuum unit 54 is connected through a vacuum conduit or line 64 to a connection 66 of a member 68. A connection 70 of member 68 is connected through a line 72 with the induction passage 12 downstream of throttle 14. The induction vacuum sensed through line 72 is reduced by a restriction 74 in member 68 to provide a vacuum signal proportional to induction vacuum for operating vacuum unit 54.

A line 76 extends from a connection 78 of member 68 to the outlet 80 of a thermal sensor 82 located in chamber 22 on the downstream or clean air side of filter element 28. Thermal sensor 82 includes an orifice 84 providing an opening for clean air flow from chamber 22 through conduits 76 and 64 to vacuum unit 54. A valve member 86, which includes a spherical head 88 contacting the outlet side of orifice 84, is positioned to control air flow through orifice 84 by a cantilever bimetallic thermostat 90 riveted at one end to a stationary arm 92 and secured at the other end to valve member 86. The tension in thermostat 90 may be adjusted by a screw 94 which positions arm 92.

In operation, when the engine is started and air flows through air cleaner 10, its temperature is sensed by thermostat 90. At temperatures below a predetermined value of perhaps 70°, thermostat 90 holds valve 88 against orifice plate 84 so that the full vacuum signal is sensed by vacuum unit 54. Diaphragm 57 is pulled back against spring 61 and valve 46 closes snorkel 30 against air flow through open end 34, permitting only warm air flow through lateral opening 42. As the air flow warms above the predetermined temperature, thermostat 90 begins to relax and the vacuum signal pulls valve head 88 away from orifice 84 to bleed air through lines 76 and 64 to vacuum unit 54. As air flows through orifice 84 the vacuum below valve head 88 is reduced, creating a tendency for valve 86 to close and thus reducing the air bleed and increasing the vacuum signal. Valve 86 thus oscillates to create a substantially constant vacuum signal less than that created by orifice 74 alone. This vacuum signal positions diaphragm 57 to hold valve 46 in an intermediate position, allowing air flow through both open end 34 of primary snorkel 30 and lateral opening 42. As the temperature of the mixed air flow further increases, the thermostat 90 may, if desired, relax to a point where valve 88 is continually open so that no vacuum signal is sensed by vacuum unit 54 and so that valve 46 permits only air flow at ambient temperature through air cleaner 10 and induction passage 12.

Under condition of wide open throttle operation, it is desirable to have the air flow into the combustion chambers as cool and dense as possible to achieve maximum power output. When operating under such conditions, of course, fuel economy is not a major consideration. In addition, the air flow under such conditions is probably sufficient to adequately vaporize the fuel delivered by the carburetor, heat being unnecessary. Therefore, the vacuum unit 54 is so calibrated that any slight vacuum signal, less than 6" HG vacuum for example, which may be generated under wide open throttle conditions is insufficient to operate the diaphragm 57, and valve 46 closes lateral opening 42 to admit only air flow at ambient temperatures through open end 34 of primary snorkel 30.

The vacuum unit 56 which operates valve 50 to control air flow through secondary snorkel 32 is connected by a vacuum line 96 to a connection 98 on member 68. Vacuum unit 56 is connected to induction passage 12 through vacuum line 72 before restriction 74 so that the full value of induction vacuum is sensed by the vacuum unit 56. Therefore, under most conditions of operation diaphragm 58 operates valve 50 to prevent air flow and emission of noise through secondary snorkel 32. However, when the value of the induction vacuum falls below a predetermined value, 6" HG vacuum for example, indicating an engine demand for air flow at rates above the capacity of primary snorkel 30, vacuum unit 56 opens valve 50 to permit air flow through secondary snorkel 32. It will be appreciated that the air bled through orifice 84 does not substantially affect operation of vacuum unit 56 due to the effect of restriction 74 in element 68.

As shown and described, thermostat 90 controls the temperature of the air mixture delivered to the engine but does not need to be strong enough to directly operate the mixing valve 46. In addition, the arrangement includes means to supply air at ambient temperatures during wide open throttle operation regardless of the ambient temperature so that maximum power may be achieved and yet to supply air at a controlled temperature under other conditions of operation. Further, the arrangement has an air flow capacity which is restricted during low engine demand for improved silencing characteristics and which is increased under high engine demand.

I claim:

1. An air cleaner and silencer assembly adapted for use with an internal combustion engine carburetor having an induction passage including an air inlet and having a throttle in said induction passage controlling flow therethrough, said air cleaner and silencer assembly comprising a housing forming a chamber having a pair of inlet openings and an outlet opening and defining an air flow path between said inlet openings and said outlet opening, said outlet opening being adapted for registration with said induction passage air inlet, air filter media disposed within said chamber across said air flow path, primary and secondary inlet conduits each extending from one of said inlet openings, said inlet conduits each having an end open to air at ambient temperatures, said primary inlet conduit having a lateral opening adapted for connection to a source of air warmed to temperatures greater than ambient, ambient air flow through the end of said primary inlet conduit and warm air flow through said lateral opening being mixed to provide an induction air flow at temperatures greater than ambient, primary valve means disposed within said primary inlet conduit and controlling air flow through said end thereof and through said lateral opening to regulate the temperature of induction air flow through said air cleaner to said carburetor, secondary valve means disposed within said secondary inlet conduit and controlling air flow through said end thereof, spring means biasing said primary and secondary valve means to permit ambient air flow through said ends of said inlet conduits and to prevent warm air flow through said lateral opening of said primary inlet conduit, primary and secondary vacuum motor means connected respectively to said primary and secondary valve means, said vacuum motor means including vacuum conduit means adapted at one end for connection to said induction passage downstream of said throttle and having first and second branches at the opposite end extending respectively to said primary and secondary vacuum motor, said vacuum motor means exerting a force on said valve means in opposition to the bias of said spring means whereby said valve means are positioned in accordance with variations in induction vacuum, and a thermal control regulating the vacuum sensed by said primary vacuum motor means whereby said primary valve means may also be positioned in accordance with temperature conditions, said thermal control including an orifice providing an opening for air flow into said first branch of said vacuum conduit means to reduce the induction vacuum sensed by said primary vacuum motor means, a valve member controlling air flow through said orifice, and thermostatically responsive means positioning said valve member to permit increased air flow through said orifice in response to an increase in temperature whereby said primary vacuum motor means may position said primary valve means to permit increased ambient air flow through said end of said primary inlet conduit and decreased warm air flow through said lateral opening of said primary inlet conduit, said first branch of said vacuum conduit means including a restriction separating said opening into said first branch from said second branch of said vacuum conduit means whereby only said primary valve means is positioned in accordance with temperature conditions and whereby said secondary valve means is positioned substantially only in accordance with variations in induction vacuum.

2. The air cleaner and silencer assembly of claim 1 wherein said thermal control further includes a base member encompassing said orifice and providing a valve seat surrounding the downstream side of said orifice, wherein said valve member includes a spherical surface cooperating with said valve seat to control air flow through said orifice, and wherein said thermostatically responsive means comprises a cantilever bimetallic strip secured at one end to said base member and connected at the opposite end to said valve member whereby said valve member is responsive both to variations in temperature and to variations in vacuum sensed by said vacuum motor means to thereby oscillate and create a substantially constant vacuum signal under steady state conditions of temperature and induction vacuum.

3. The air cleaner and silencer assembly of claim 1 wherein said thermal control base member includes an arm to which said bimetallic strip is secured and means for positioning said arm to thereby adjust the tension in said bimetallic strip.

4. An air inlet silencer assembly adapted for use with an internal combustion engine having an induction passage including an air inlet, said silencer assembly comprising a housing forming a silencing chamber, an outlet opening from said silencing chamber and adapted for registration with said induction passage air inlet, primary and secondary inlets opening into said silencing chamber, and primary and secondary tuned inlet conduits extending to said primary and secondary inlets respectively, said silencing chamber and said primary and secondary inlets and tuned inlet conduits providing means for controlling emission of noise from said induction passage air inlet, said silencer assembly further comprising valve means closing said secondary inlet under low induction air flow conditions to reduce emission of noise, and valve operating means connected to said valve means and adapted to open said secondary inlet under high induction air flow conditions to increase the air flow capacity of said silencer assembly.

5. The air inlet silencer assembly of claim 4 adapted for use with an internal combustion engine having an induction passage including an air inlet and having a throttle in said induction passage controlling flow therethrough wherein said valve operating means comprises a pressure responsive member connected to said valve means and adapted to open said secondary inlet at pressures in said induction passage downstream of said throttle above a predetermined value.

References Cited

UNITED STATES PATENTS

| | | |
|---|---|---|
| 1,242,926 | 10/1917 | Donning. |
| 2,058,204 | 10/1936 | Bell et al. |
| 2,082,397 | 6/1937 | Hiscock. |
| 2,123,347 | 7/1938 | Ware. |
| 2,289,635 | 7/1942 | Edelen. |
| 2,395,997 | 3/1946 | Eckel _____ 261—16 X |
| 2,557,717 | 6/1951 | Anthony _____ 55—418 |
| 2,788,086 | 4/1957 | Sebok _____ 55—419 X |
| 2,789,662 | 4/1957 | McMullen _____ 55—276 |
| 2,883,112 | 4/1959 | Stoltman _____ 236—101 |
| 2,906,370 | 9/1959 | McMullen et al. _____ 55—276 |
| 2,936,853 | 5/1960 | Heller et al. _____ 55—419 |
| 2,983,592 | 5/1961 | Jones _____ 48—180 X |
| 3,024,776 | 3/1962 | Skirvin. |
| 3,077,341 | 2/1963 | Schlichting. |
| 3,092,091 | 6/1963 | Bosley. |
| 3,081,984 | 3/1963 | Wise _____ 261—23 |

FOREIGN PATENTS

| | | |
|---|---|---|
| 569,331 | 1/1959 | Canada. |

HARRY B. THORNTON, *Primary Examiner.*

DENNIS E. TALBERT, JR., *Assistant Examiner.*

U.S. Cl. X.R.

48—180; 55—276, 385, 417, 419, 510; 123—119, 122; 137—457; 181—33; 261—16